US012437696B2

(12) United States Patent
Azizi et al.

(10) Patent No.: US 12,437,696 B2
(45) Date of Patent: Oct. 7, 2025

(54) EMISSION ROW SHUFFLING FOR PULSED ELECTRONIC DISPLAYS

(71) Applicant: Apple Inc., Cupertino, CA (US)

(72) Inventors: Yaser Azizi, Santa Clara, CA (US); Haitao Li, Mountain View, CA (US); Hopil Bae, Palo Alto, CA (US); Mahdi Farrokh Baroughi, Santa Clara, CA (US); Xiang Lu, Campbell, CA (US); Seung B Rim, Pleasanton, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/358,012

(22) Filed: Jul. 24, 2023

(65) Prior Publication Data

US 2024/0054936 A1 Feb. 15, 2024

Related U.S. Application Data

(60) Provisional application No. 63/398,191, filed on Aug. 15, 2022.

(51) Int. Cl.
*G09G 3/20* (2006.01)
*G09G 3/32* (2016.01)

(52) U.S. Cl.
CPC ......... *G09G 3/2085* (2013.01); *G09G 3/2096* (2013.01); *G09G 3/32* (2013.01); *G09G 2300/0452* (2013.01); *G09G 2300/06* (2013.01); *G09G 2310/08* (2013.01); *G09G 2320/0261* (2013.01); *G09G 2320/0266* (2013.01)

(58) Field of Classification Search
CPC .. G09G 3/2085; G09G 3/2096; G09G 3/2025; G09G 3/32; G09G 3/2014; G09G 2300/0452; G09G 2300/06; G09G 2310/0272; G09G 2310/08; G09G 2310/0213; G09G 2320/0261; G09G 2320/0266
USPC .................................................... 345/691, 82
See application file for complete search history.

(56) References Cited

U.S. PATENT DOCUMENTS

| | | | | |
|---|---|---|---|---|
| 8,525,824 | B2 | 9/2013 | Okamura et al. | |
| 10,535,296 | B2 | 1/2020 | Sakariya et al. | |
| 10,777,116 | B1 | 9/2020 | Vahid Far et al. | |
| 10,880,346 | B2 | 12/2020 | Adams et al. | |
| 2004/0239606 | A1 | 12/2004 | Ota | |
| 2018/0211582 | A1* | 7/2018 | Sakariya .................. | G09G 3/32 |
| 2019/0347985 | A1* | 11/2019 | Shaeffer ................. | H10K 59/17 |
| 2022/0091418 | A1 | 3/2022 | Choi et al. | |

* cited by examiner

*Primary Examiner* — Jimmy H Nguyen
(74) *Attorney, Agent, or Firm* — Fletcher Yoder, P.C.

(57) ABSTRACT

Electronic devices, displays, and methods are provided for performing row shuffling to reduce an appearance of image artifacts during eye movements such as saccades. An electronic display may include a number of rows of display pixels and driving circuitry to drive the rows of pixels. The driving circuitry may spatially shuffle or temporally shuffle, or both spatially and temporally shuffle, a row order of driving the rows of display pixels.

24 Claims, 15 Drawing Sheets

EMISSION ROW SHUFFLING FOR PULSED ELECTRONIC DISPLAYS

CROSS-REFERENCE TO RELATED APPLICATION

This application claims priority to U.S. Patent Application No. 63/398,191, filed on Aug. 15, 2022, titled "Emission Row Shuffling for Pulsed Electronic Displays," which is hereby incorporated by reference in its entirety for all purposes.

SUMMARY

The present disclosure relates generally to electronic devices with display panels and, more particularly, to shuffling the order of emission rows of a display panel to display image content.

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

Electronic displays may display images that present visual representations of information. Accordingly, numerous electronic systems—such as computers, mobile phones, portable media devices, tablets, televisions, virtual-reality headsets, and vehicle dashboards, among many others—often include or use electronic displays. In any case, the electronic display may display an image by actively controlling light emission from its display pixels. By driving the display pixels to emit a light, a variety of different colors may be generated that collectively produce a corresponding image.

In some embodiments, the electronic display may be a pulsed electronic display, such as a micro-light-emitting diode (micro-LED) display. The micro-LED display includes display pixels with micro-LEDs to emit light, and driving circuitry to drive the display pixels (e.g., referred to as micro-driver). The micro-LED display may include a number of local passive matrices (LPMs) with a grid of horizontal and vertical conductors (e.g., cathode, anode) connected to a micro-driver controlling the emission (e.g., emission timing pulses) of the display pixels. The micro-drivers may cause display pixels to emit light for a frame of image content over multiple subframes. Each subframe may be displayed by the micro-driver driving rows of the display pixels over a period of time. The row emissions may be integrated by the human eye over time to produce the perception of a seamless image on the micro-LED display. However, the human eye occasionally undergoes movements, known as saccades, when switching from viewing one location to viewing another. In certain instances, a timing of the row emission rolling of the display pixels may align with the human eye movement, resulting in image artifacts, such as bright or dark line patterns. In other words, the eye may spatially integrate light from multiple display pixel rows causing image artifacts to be perceived.

Spatial filtering, such as shuffling the row emission rolling order, may be applied to reduce or eliminate image artifacts. A spatial mix of patterns may be used across rows, columns, or subframes, or a combination thereof, of the LPMs to shuffle row emission order. In one example, row emissions for a first set of rows of a first LPM or first portion of the first LPM may start from a first row to a last row of the first set, while row emissions for a second set of rows of a second LPM or a second portion of the first LPM may start from a last row to a first row of the second set. In this way, the row emission order may be shuffled by rows and the human eye may be less likely to perceive image artifacts during saccades.

In another example, the timing of row emission rolling of the display pixels may be shuffled across different columns of LPMs. For example, row emissions in a first column may consecutively move from a last row to a first row, while row emissions in a second column may sequentially emit light from a first row to a last row. In this way, different columns of LPMs may have differing row emission order. Still, in another example, row emission rolling of the display pixels may be shuffled within a column of LPMs. For example, a first set of rows within a first column may follow an arbitrary pattern for emissions, while a second set of rows within the first column may emit light sequentially. A second column may include a first set of rows emitting light sequentially, while a second set of rows may emit light starting from a last row to a first row. Accordingly, a large number of different patterns for row emissions within rows, columns, or a combination thereof of the LPMs may be used to reduce perceived image artifacts due to eye movement.

Additionally or alternatively, a temporal mix of patterns may be used over one or more subframes of the LPM. For example, a first subframe may have a first pattern, while a second subframe may have a second pattern. In another example, a pattern may be used for each different subframes of the LPM. Indeed, row emission rolling of the display pixels may be shuffled across rows, columns, or subframes of the LPM. This may further reduce the likelihood that timing of the row emission order may line up with the human eye movement, thereby reducing or eliminating perceived image artifacts within image content displayed on the micro-LED display.

Accordingly, the present disclosure provides systems and techniques for compensation of image artifacts within the image content of the electronic display due to spatial integration of light caused by saccades. At the LPM level, the micro-driver, in combination with the cathodes and anodes, may drive one or more rows of display pixels to emit light based on a pattern (e.g., row emission order). Additionally or alternatively, at the subframe level, one or more micro-drivers may drive one or more rows of display pixels to emit light based on a pattern (e.g., row emission order). As such, image artifacts may be dispersed over space (e.g., rows, columns, subframes) and time, thereby reducing or eliminating the chances of saccades correlation with row emission rolling order. Accordingly, many image artifacts may be reduced or eliminated.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings in which.

DETAILED DESCRIPTION

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. Furthermore, the phrase A "based on" B is intended to mean that A is at least partially based on B. Moreover, the term "or" is intended to be inclusive (e.g., logical OR) and not exclusive (e.g., logical XOR). In other words, the phrase A "or" B is intended to mean A, B, or both A and B.

Figure 1:
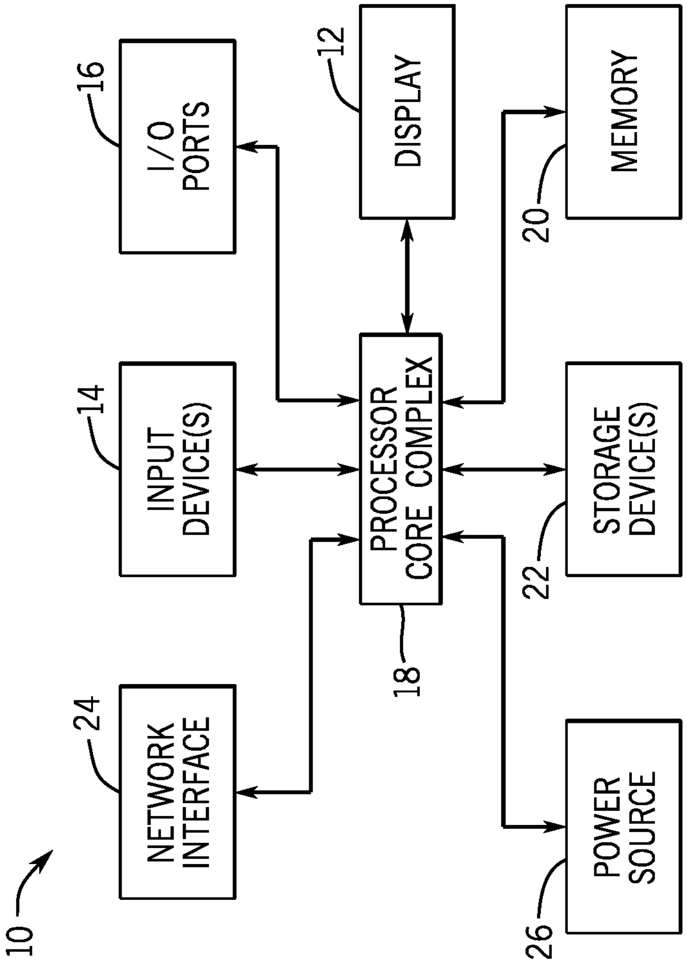
FIG. 1 is a block diagram of an electronic device with an electronic display, in accordance with an embodiment of the present disclosure.

With the preceding in mind and to help illustrate, an electronic device 10 including an electronic display 12 is shown in FIG. 1. As is described in more detail below, the electronic device 10 may be any suitable electronic device, such as a computer, a mobile phone, a portable media device, a tablet, a television, a virtual-reality headset, a wearable device such as a watch, a vehicle dashboard, or the like. Thus, it should be noted that FIG. 1 is merely one example of a particular implementation and is intended to illustrate the types of components that may be present in an electronic device 10.

The electronic device 10 includes the electronic display 12, one or more input devices 14, one or more input/output (I/O) ports 16, a processor core complex 18 having one or more processing circuitry(s) or processing circuitry cores, local memory 20, a main memory storage device 22, a network interface 24, and a power source 26 (e.g., power supply). The various components described in FIG. 1 may include hardware elements (e.g., circuitry), software elements (e.g., a tangible, non-transitory computer-readable medium storing executable instructions), or a combination of both hardware and software elements. It should be noted that the various depicted components may be combined into fewer components or separated into additional components. For example, the local memory 20 and the main memory storage device 22 may be included in a single component.

The processor core complex 18 is operably coupled with local memory 20 and the main memory storage device 22. Thus, the processor core complex 18 may execute instructions stored in local memory 20 or the main memory storage device 22 to perform operations, such as generating or transmitting image data to display on the electronic display 12. As such, the processor core complex 18 may include one or more general purpose microprocessors, one or more application specific integrated circuits (ASICs), one or more field programmable logic arrays (FPGAs), or any combination thereof.

In addition to program instructions, the local memory 20 or the main memory storage device 22 may store data to be processed by the processor core complex 18. Thus, the local memory 20 and/or the main memory storage device 22 may include one or more tangible, non-transitory, computer-readable media. For example, the local memory 20 may include random access memory (RAM) and the main memory storage device 22 may include read-only memory (ROM), rewritable non-volatile memory such as flash memory, hard drives, optical discs, or the like.

The network interface 24 may communicate data with another electronic device or a network. For example, the network interface 24 (e.g., a radio frequency system) may enable the electronic device 10 to communicatively couple to a personal area network (PAN), such as a Bluetooth network, a local area network (LAN), such as an 802.11x Wi-Fi network, or a wide area network (WAN), such as a 4G, Long-Term Evolution (LTE), or 5G cellular network. The power source 26 may provide electrical power to one or more components in the electronic device 10, such as the processor core complex 18 or the electronic display 12. Thus, the power source 26 may include any suitable source of energy, such as a rechargeable lithium polymer (Li-poly) battery or an alternating current (AC) power converter. The I/O ports 16 may enable the electronic device 10 to interface with other electronic devices. For example, when a portable storage device is connected, the I/O port 16 may enable the processor core complex 18 to communicate data with the portable storage device.

The input devices 14 may enable user interaction with the electronic device 10, for example, by receiving user inputs via a button, a keyboard, a mouse, a trackpad, or the like. The input device 14 may include touch-sensing components or reutilize display components in the electronic display 12. The touch sensing components may receive user inputs by detecting occurrence or position of an object touching the surface of the electronic display 12.

In addition to enabling user inputs, the electronic display 12 may include a display panel with display pixels. The electronic display 12 may control light emission from the display pixels to present visual representations of information, such as a graphical user interface (GUI) of an operating system, an application interface, a still image, or video content, by displaying frames of image data. To display images, the electronic display 12 may include display pixels implemented on the display panel. The display pixels may represent sub-pixels that each control a luminance value of one color component (e.g., red, green, or blue for an RGB pixel arrangement or red, green, blue, or white for an RGBW arrangement).

The electronic display 12 may display an image by controlling light emission from its display pixels based on pixel or image data associated with corresponding image pixels (e.g., points) in the image. In some embodiments, pixel or image data may be generated by an image source, such as the processor core complex 18, a graphics processing unit (GPU), or an image sensor. Additionally, in some embodiments, image data may be received from another electronic device 10, for example, via the network interface 24 and/or an I/O port 16. Similarly, the electronic display 12 may display frames based on pixel or image data generated by the processor core complex 18, or the electronic display 12 may display frames based on pixel or image data received via the network interface 24, an input device, or an I/O port 16.

Figure 2:
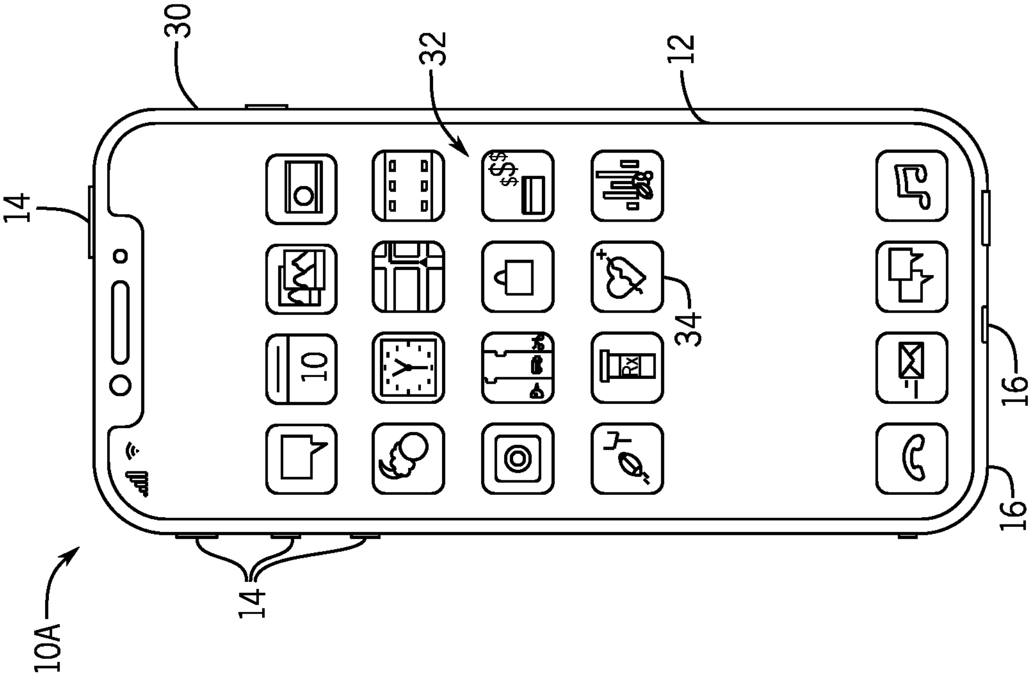
FIG. 2 is a front view of a handheld device representing another embodiment of the electronic device of FIG. 1, in accordance with an embodiment of the present disclosure.

The electronic device 10 may be any suitable electronic device. To help illustrate, an example of the electronic device 10, a handheld device 10A, is shown in FIG. 2. The handheld device 10A may be a portable phone, a media player, a personal data organizer, a handheld game platform, or the like. For illustrative purposes, the handheld device 10A may be a smart phone, such as any iPhone® model available from Apple Inc.

The handheld device 10A includes an enclosure 30 (e.g., housing). The enclosure 30 may protect interior components from physical damage or shield them from electromagnetic interference, such as by surrounding the electronic display 12. The electronic display 12 may display a graphical user interface (GUI) 32 having an array of icons. When an icon 34 is selected either by an input device 14 or a touch-sensing component of the electronic display 12, an application program may launch.

The input devices 14 may be accessed through openings in the enclosure 30. The input devices 14 may enable a user to interact with the handheld device 10A. For example, the input devices 14 may enable the user to activate or deactivate the handheld device 10A, navigate a user interface to a home screen, navigate a user interface to a user-configurable application screen, activate a voice-recognition feature, provide volume control, or toggle between vibrate and ring modes.

Figure 3:
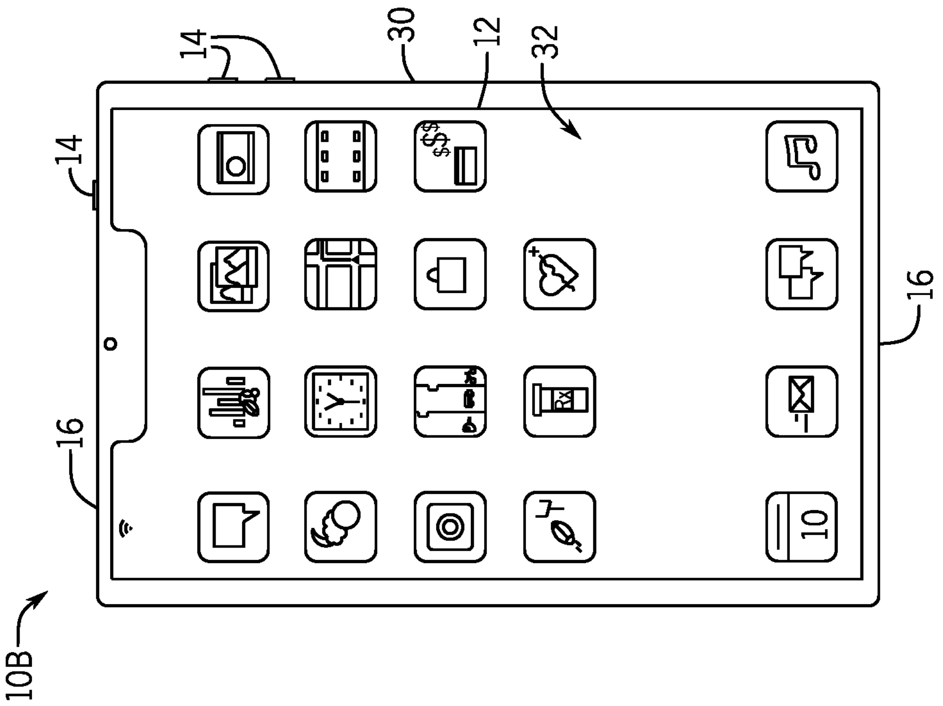
FIG. 3 is a front view of another handheld device representing another embodiment of the electronic device of FIG. 1, in accordance with an embodiment of the present disclosure.
Figure 4:
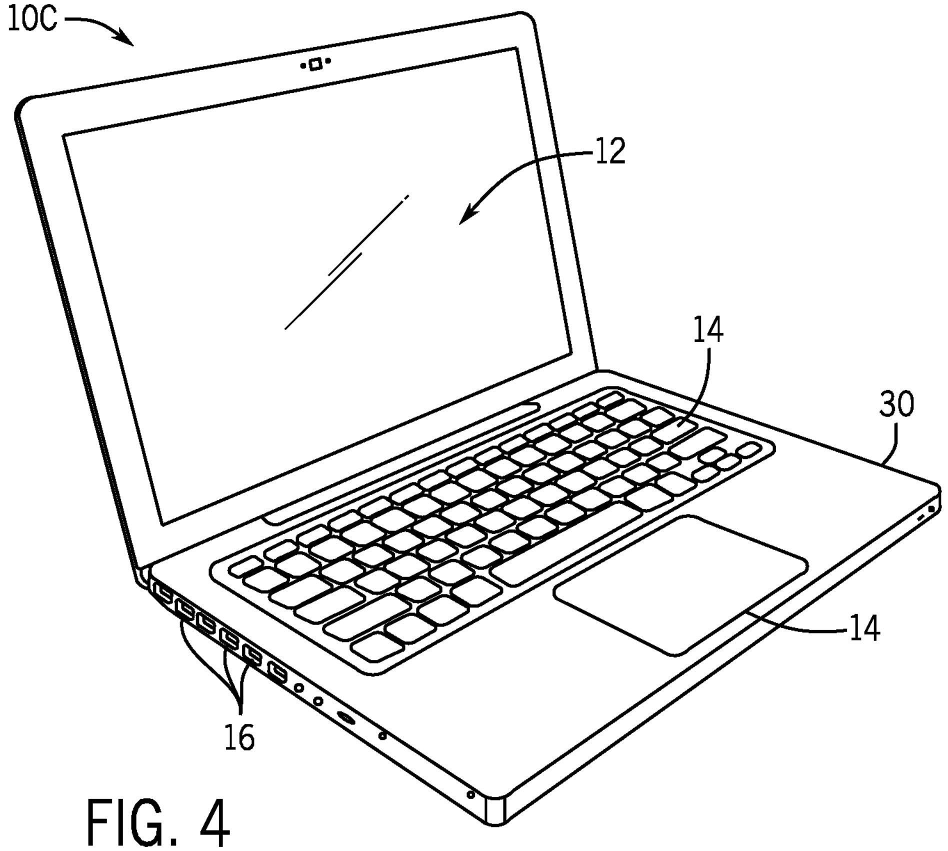
FIG. 4 is a perspective view of a notebook computer representing an embodiment of the electronic device of FIG. 1, in accordance with an embodiment of the present disclosure.
Figure 5:
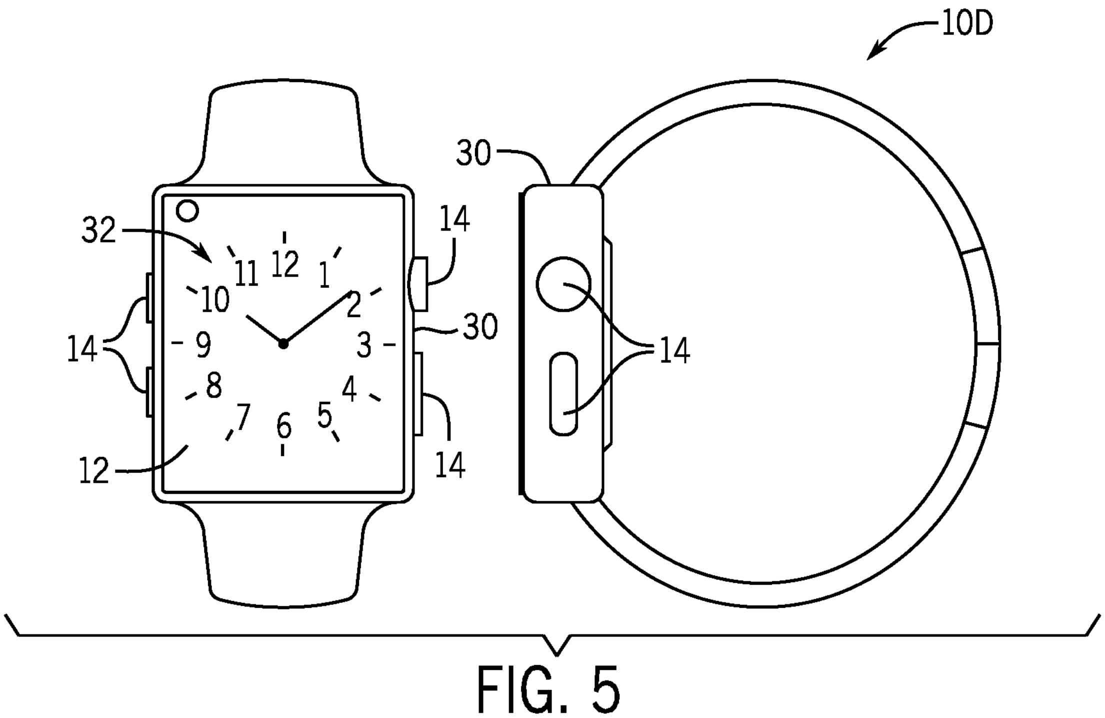
FIG. 5 is a front view and side view of a wearable electronic device representing another embodiment of the electronic device of FIG. 1, in accordance with an embodiment of the present disclosure.

Another example of a suitable electronic device 10, specifically a tablet device 10B, is shown in FIG. 3. The tablet device 10B may be any iPad® model available from Apple Inc. A further example of a suitable electronic device 10, specifically a computer 10C, is shown in FIG. 4. For illustrative purposes, the computer 10C may be any MacBook® or iMac® model available from Apple Inc. Another example of a suitable electronic device 10, specifically a watch 10D, is shown in FIG. 5. For illustrative purposes, the watch 10D may be any Apple Watch® model available from Apple Inc. As depicted, the tablet device 10B, the computer 10C, and the watch 10D each also includes an electronic display 12, input devices 14, I/O ports 16, and an enclosure 30. The electronic display 12 may display a GUI 32. Here, the GUI 32 shows a visualization of a clock. When the visualization is selected either by the input device 14 or a touch-sensing component of the electronic display 12, an application program may launch, such as to transition the GUI 32 to presenting the icons 34 discussed in FIGS. 2 and 3.

Figure 6:
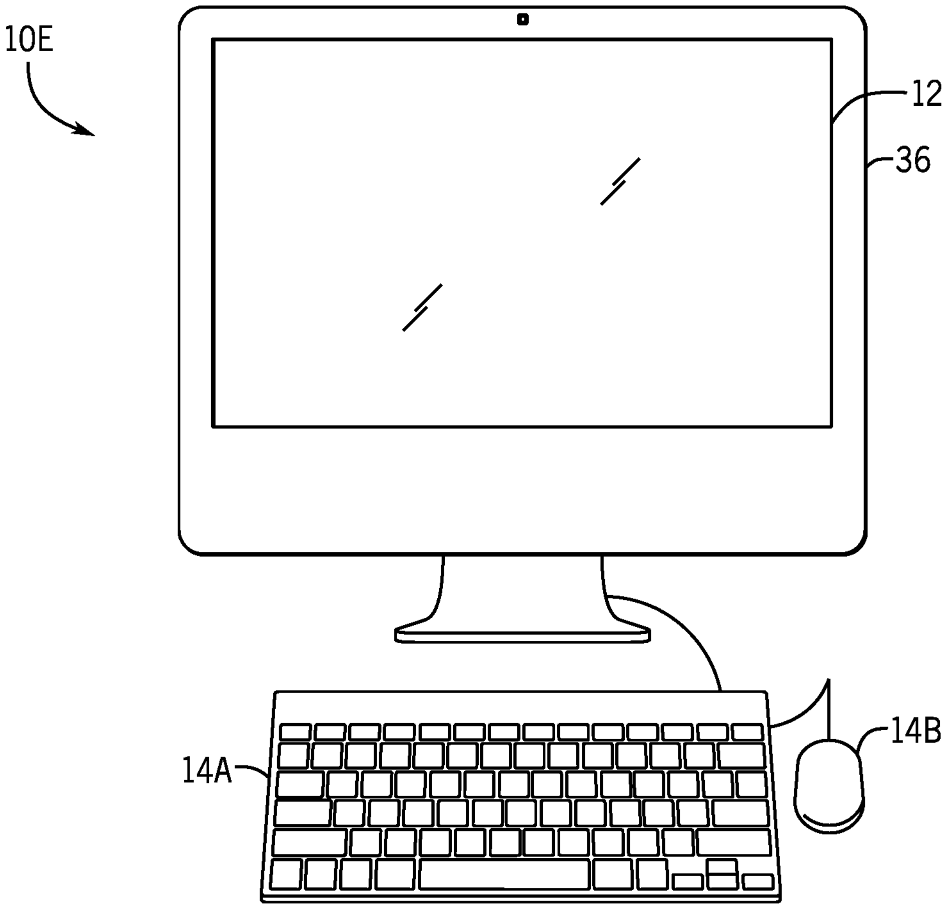
FIG. 6 is a front view of a desktop computer representing another embodiment of the electronic device of FIG. 1, in accordance with an embodiment of the present disclosure.

Turning to FIG. 6, a computer 10E may represent another embodiment of the electronic device 10 of FIG. 1. The computer 10E may be any computer, such as a desktop computer, a server, or a notebook computer, but may also be a standalone media player or video gaming machine. By way of example, the computer 10E may be an iMac®, a MacBook®, or other similar device by Apple Inc. of Cupertino, California. It should be noted that the computer 10E may also represent a personal computer (PC) by another manufacturer. A similar enclosure 36 may be provided to protect and enclose internal components of the computer 10E, such as the electronic display 12. In certain embodiments, a user of the computer 10E may interact with the computer 10E using various peripheral input structures 14, such as the keyboard 14A or mouse 14B (e.g., input structures 14), which may connect to the computer 10E.

Figure 7:
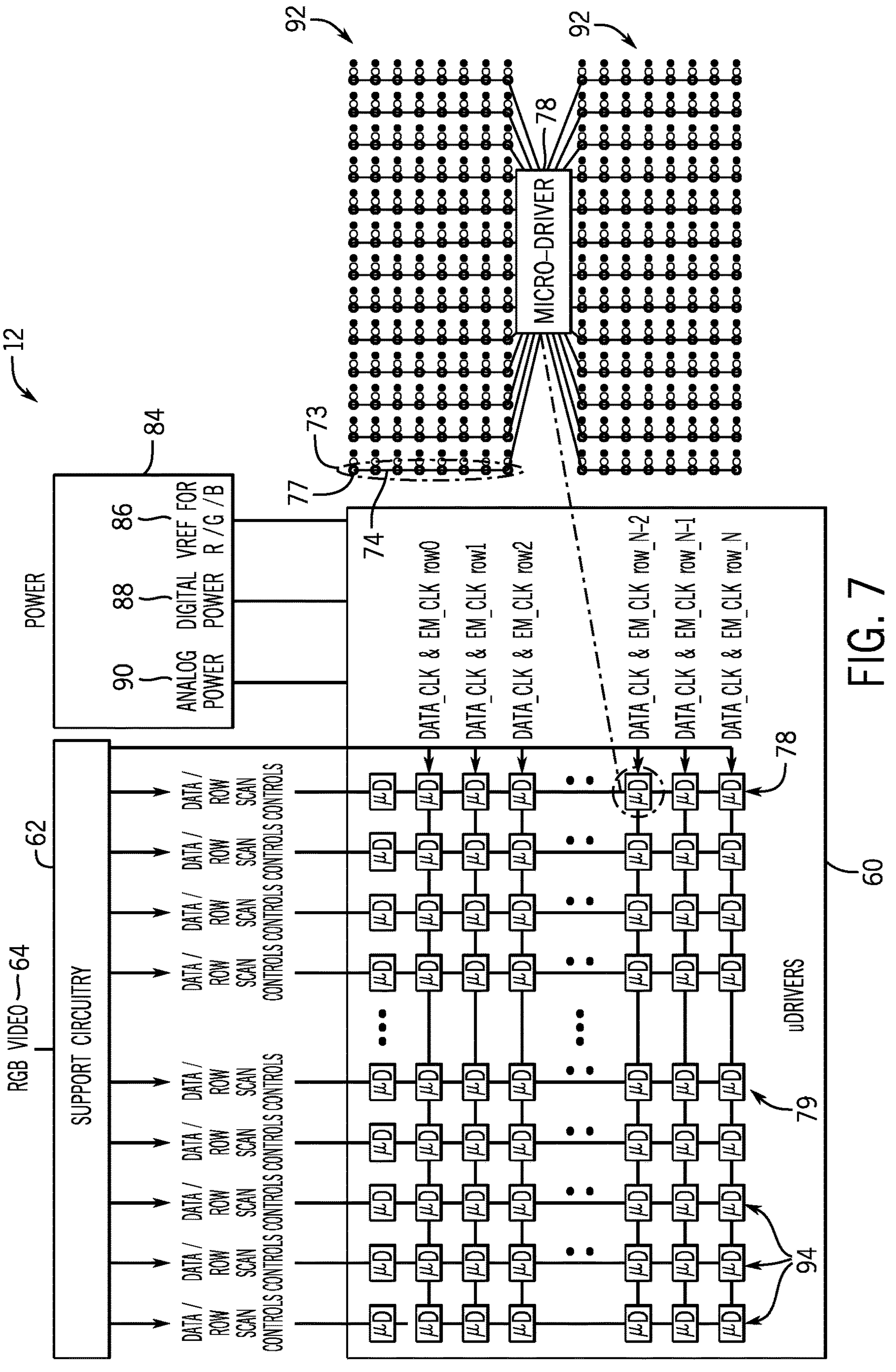
FIG. 7 is a block diagram of a micro-LED display that employs micro-drivers to drive display pixels with controls signals, in accordance with an embodiment of the present disclosure.

FIG. 7 depicts a block diagram of an example architecture of the electronic display 12 (e.g., micro-LED display). In the example of FIG. 7, the electronic display 12 uses an RGB display panel 60 with pixels that include red, green, and blue micro-LEDs as display pixels. Support circuitry 62 may receive RGB-format video image data 64. It should be appreciated, however, that the electronic display 12 may alternatively display other formats of image data, in which case the support circuitry 62 may receive image data of such different image format. In some embodiments, the support circuitry 62 may include a video timing controller (video TCON) and/or emission timing controller (emission TCON) that receives and uses the image data 64 in a serial bus to determine a data clock signal (DATA_CLK) and/or an emission clock signal (EM_CLK) to control the provision of the image data 64 in the electronic display 12. The video TCON may also pass the image data 64 to a serial-to-parallel circuitry that may deserialize the image data 64 signal into several parallel image data signals. That is, the serial-to-parallel circuitry may collect the image data 64 into the particular data signals that are passed on to specific columns among a total of M respective columns in the display panel 60. As noted above, the video TCON may generate the data clock signal (DATA_CLK), and the emission TCON may generate the emission clock signal (EM_CLK). Collectively, these may be referred to as Data/Row Scan Control signals, as illustrated in FIG. 7. As such, the data is labeled DATA/ROW SCAN CONTROLS. The data/row scan controls respectively contain image data corresponding to pixels in the first column, second column, third column, fourth column fourth-to-last column, third-to-last column, second-to-last column, and last column, respectively. The data/row scan controls may be collected into more or fewer columns depending on the number of columns that make up the display panel 60.

In particular, the display panel 60 includes micro-drivers 78. The micro-drivers 78 are arranged in an array 79. Each micro-driver 78 drives a number of display pixels 77. The display pixels 77 driven by each micro-driver 78 may be arranged as a local passive matrix (LPM) 92. In one example, each micro-driver 78 drives two local passive matrices (LPMs) 92 of display pixels 77, one above the micro-driver 78 and one below the micro-driver 78. Before continuing, it should be appreciated that the array 79 thus may have LPM columns 94 that include multiple different LPMs 92 that are driven by different micro-drivers 78. For each LPM 92, different display pixels 77 may include different combination of colored micro-LEDs (e.g., a red micro-LED, a green micro-LED, or a blue micro-LED) to represent the image data 64 in RGB format. For example, the combinations may include a red micro-LED and a green micro-LED, a blue micro-LED and a green micro-LED, a red micro-LED and a blue micro-LED, and so on. Although one of the micro-drivers 78 of FIG. 7 is shown to drive a local passive matrix (LPM) 92 having twenty-six anode groups 73 having eight display pixels 77 each, each micro-driver 78 may drive more or fewer anode groups 73 and respective display pixels 77. As illustrated, the subset of display pixels 77 located on each anode group 73 may be associated with a particular color (e.g., red, green, blue). As mentioned above, it should be noted that a respective cathode corresponds to a subset of display pixels 77 associated with a particular color even though each cathode for a particular color channel is not illustrated in FIG. 7. For example, anode 74 corresponds to a red color channel (e.g., subset of red display pixels 77) and there may be a corresponding shared cathode for all color channels or a separate cathode corresponding to the red color channel There are a second set of anodes that couple to a green color channel (e.g., subset of green display pixels 77) and a third set of anodes that couple to a blue color channel (subset of blue display pixels 77), but these are not expressly illustrated in FIG. 7 for ease of description. Each micro-driver 78 may drive one row of display pixels 77 of each LPM at a time.

A power supply 84 may provide a reference voltage (VREF) 86 to drive the micro-LEDs, a digital power signal 88, and an analog power signal 90. In some cases, the power supply 84 may provide more than one reference voltage (VREF) 86 signal. Namely, display pixels 77 of different colors may be driven using different reference voltages. As such, the power supply 84 may provide more than one reference voltage (VREF) 86. Additionally or alternatively, other circuitry on the display panel 60 may step the reference voltage (VREF) 86 up or down to obtain different reference voltages to drive different colors of micro-LED.

Figure 8:
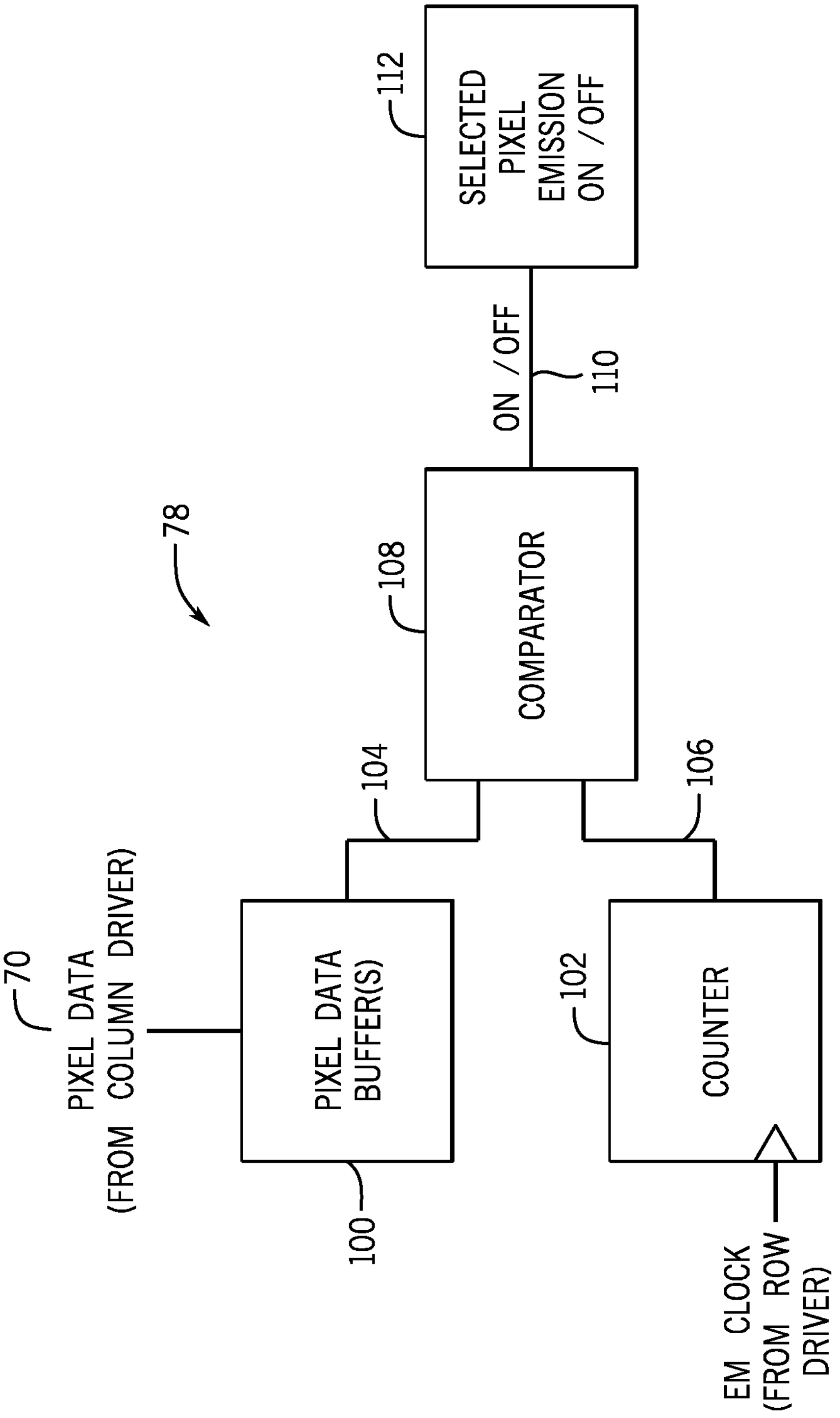
FIG. 8 is a block diagram schematically illustrating an operation of a micro-driver of FIG. 7, in accordance with an embodiment of the present disclosure.

A block diagram shown in FIG. 8 illustrates some of the components of one of the micro-drivers 78 used to drive one display pixel 77. The micro-driver 78 shown in FIG. 7 includes pixel data buffer(s) 100 and a digital counter 102. The pixel data buffer(s) 100 may include sufficient storage to hold the image data 70 that is provided. For instance, the micro-driver 78 may include pixel data buffers to store image data 70 for a display pixel 77 at any one time (e.g., for one RGB pixel group of 8-bit image data 70, this may be 24 bits of storage). It should be appreciated, however, that the micro-driver 78 may include more or fewer buffers, depending on the data rate of the image data 70, the number of display pixels 77 to be driven by the image data 70, and the number of pixels 77 in a row of one of the local passive matrices (LPMs) 92 driven by the micro-driver 78. The pixel data buffer(s) 100 may take any suitable logical structure based on the order that the column driver 74 provides the image data 70. For example, the pixel data buffer(s) 100 may include a first-in-first-out (FIFO) logical structure or a last-in-first-out (LIFO) structure.

When the pixel data buffer(s) 100 has received and stored the image data 70, a row-driver may provide the emission clock signal (EM_CLK). The row-driver may be integrated within the micro-driver 78 or be a separate component within the electronic device 10 and communicatively coupled to the pixel data buffer(s) 100. A counter 102 may receive the emission clock signal (EM_CLK) as an input. The pixel data buffer(s) 100 may output enough of the stored image data 70 to output a digital data signal 104 to represent a desired gray level for a particular display pixel 77 that is to be driven by the micro-driver 78. The counter 102 may also output a digital counter signal 106 indicative of the number of edges (only rising, only falling, or both rising and falling edges) of the emission clock signal (EM_CLK) 98. The signals 104 and 106 may enter a comparator 108 that outputs an emission control signal 110 in an "on" state when the signal 106 does not exceed the signal 104, and an "off" state otherwise. The emission control signal 110 may be routed to driving circuitry (not shown) for the display pixel 77 being driven, which may cause light emission 112 from the selected display pixel 77 to be on or off. The longer the selected display pixel 77 is driven "on" by the emission control signal 110, the greater the amount of light that will be perceived by the human eye as originating from the display pixel 77.

Figure 9:
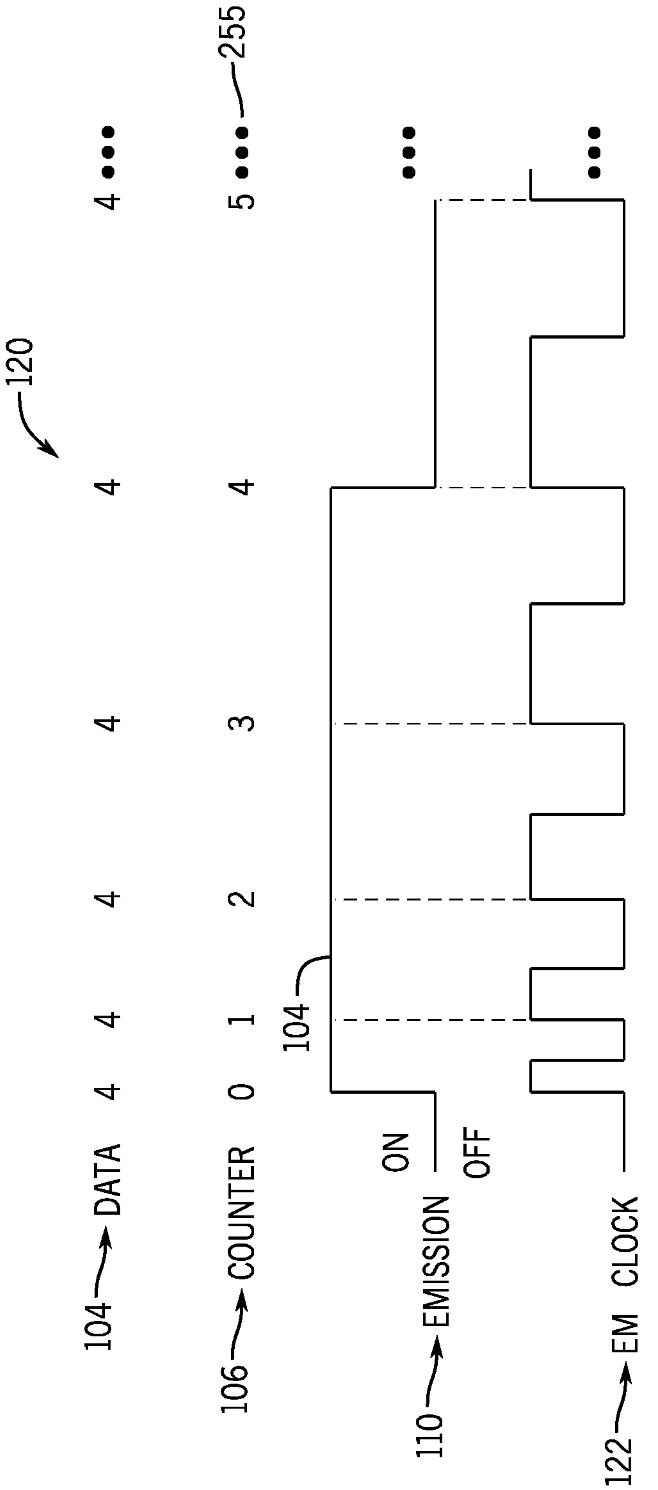
FIG. 9 is a timing diagram illustrating an example operation of the micro-driver of FIG. 8, in accordance with an embodiment of the present disclosure.

A timing diagram 120, shown in FIG. 9, provides one brief example of the operation of the micro-driver 78. The timing diagram 120 shows the digital data signal 104, the digital counter signal 106, the emission control signal 110, and the emission clock signal (EM_CLK) represented by numeral 122. In the example of FIG. 9, the gray level for driving the selected display pixel 77 is gray level 4, and this is reflected in the digital data signal 104. The emission control signal 110 drives the display pixel 77 "on" for a period of time defined as gray level 4 based on the emission clock signal (EM_CLK). Namely, as the emission clock signal (EM_CLK) rises and falls, the digital counter signal 106 gradually increases. The comparator 108 outputs the emission control signal 110 to an "on" state as long as the digital counter signal 106 remains less than the data signal 104. When the digital counter signal 106 reaches the value of the data signal 104, the comparator 108 outputs the emission control signal 110 to an "off" state, thereby causing the selected display pixel 77 no longer to emit light.

It should be noted that the steps between gray levels are reflected by the steps between emission clock signal (EM_CLK) edges. That is, based on the way humans perceive light, to notice the difference between lower gray levels, the difference between the amounts of light emitted between two lower gray levels may be relatively small. To notice the difference between higher gray levels, however, the difference between the amounts of light emitted between two higher gray levels may be comparatively much greater. The emission clock signal (EM_CLK) therefore may use relatively short time intervals between clock edges at first. To account for the increase in the difference between light emitted as gray levels increase, the differences between edges (e.g., periods) of the emission clock signal (EM_CLK) may gradually lengthen. The particular pattern of the emission clock signal (EM_CLK), as generated by the emission TCON, may have increasingly longer differences between edges (e.g., periods) so as to provide a gamma encoding of the gray level of the display pixel 77 being driven.

Figure 10:
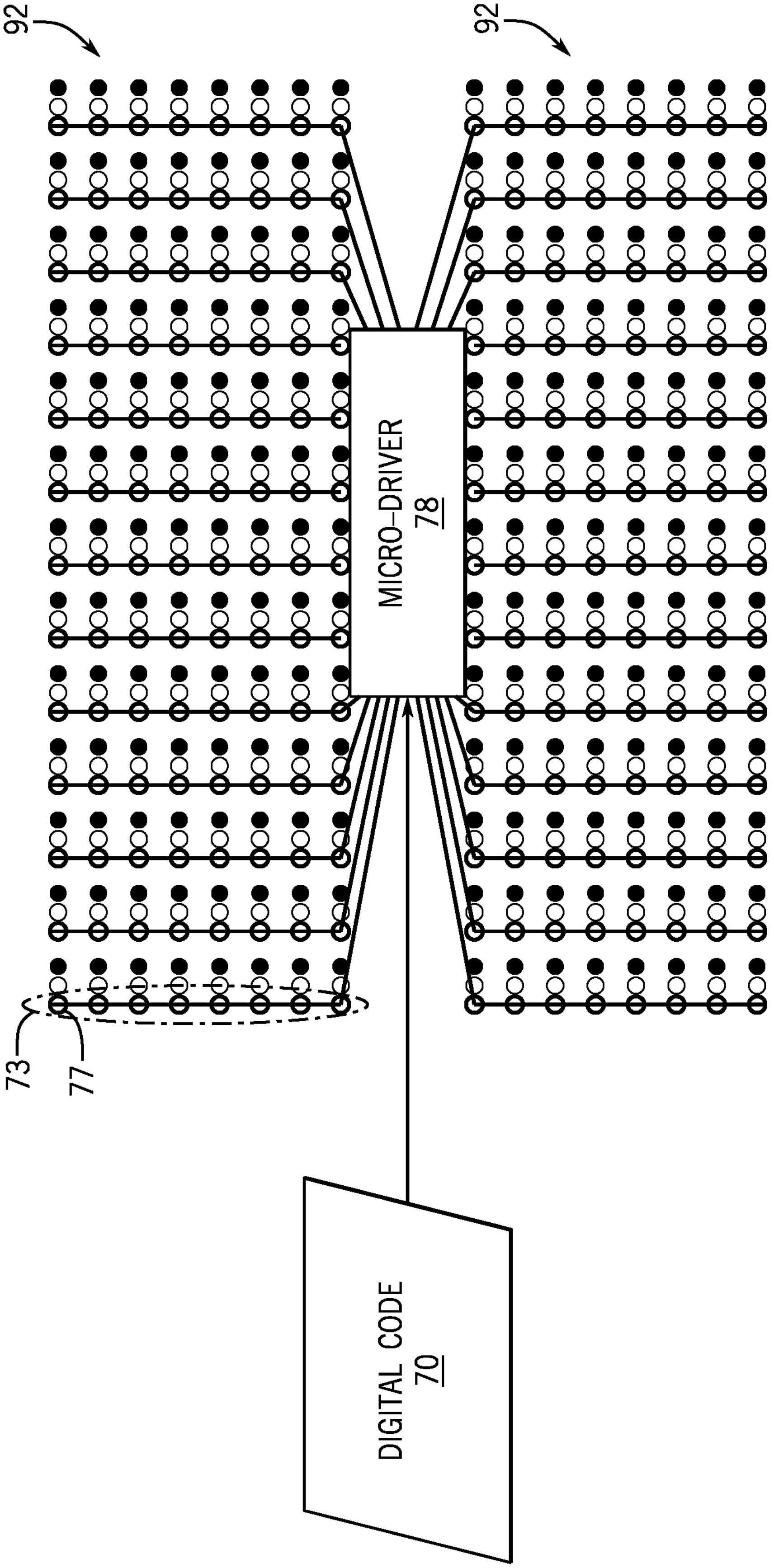
FIG. 10 is a schematic illustration of the micro-LED display of FIG. 7, where the micro-driver controls a collection of display pixels based on a digital code, in accordance with an embodiment of the present disclosure.

With the preceding in mind, FIG. 10 illustrates the micro-driver 78 driving the display pixels 77 according to the image data 70, and thereby enabling image content to be displayed by the electronic display 12. As mentioned above, the micro-driver 78 may drive any suitable number of display pixels 77, and a subset of display pixels 77 may be located on respective anodes 74 of the electronic display 12. As illustrated, the subset of display pixels 77 located on each anode 74 may be associated with a particular color (e.g., red, green, blue). Further, it should be noted that a respective cathode corresponds to a subset of display pixels 77 associated with a particular color even though each cathode for a particular color channel is not illustrated in FIG. 10. For example, as illustrated, a first set of cathodes corresponds to a red color channel (e.g., subset of red display pixels 77). However, there may be a second set of cathodes that couple to a green color channel (e.g., subset of green display pixels 77) and a third set of cathodes that couple to a blue color channel (subset of blue display pixels 77). The second set of cathodes and the third set of cathodes are not expressly illustrated in FIG. 10 for ease of description. As discussed with respect to FIG. 7, display pixels 77 driven by each micro-driver 78 may be arranged in the LPM 92. In the LPM array 92, a respective cathode may be shared for all sub-pixels colors in a row of display pixels 77.

Figure 11:
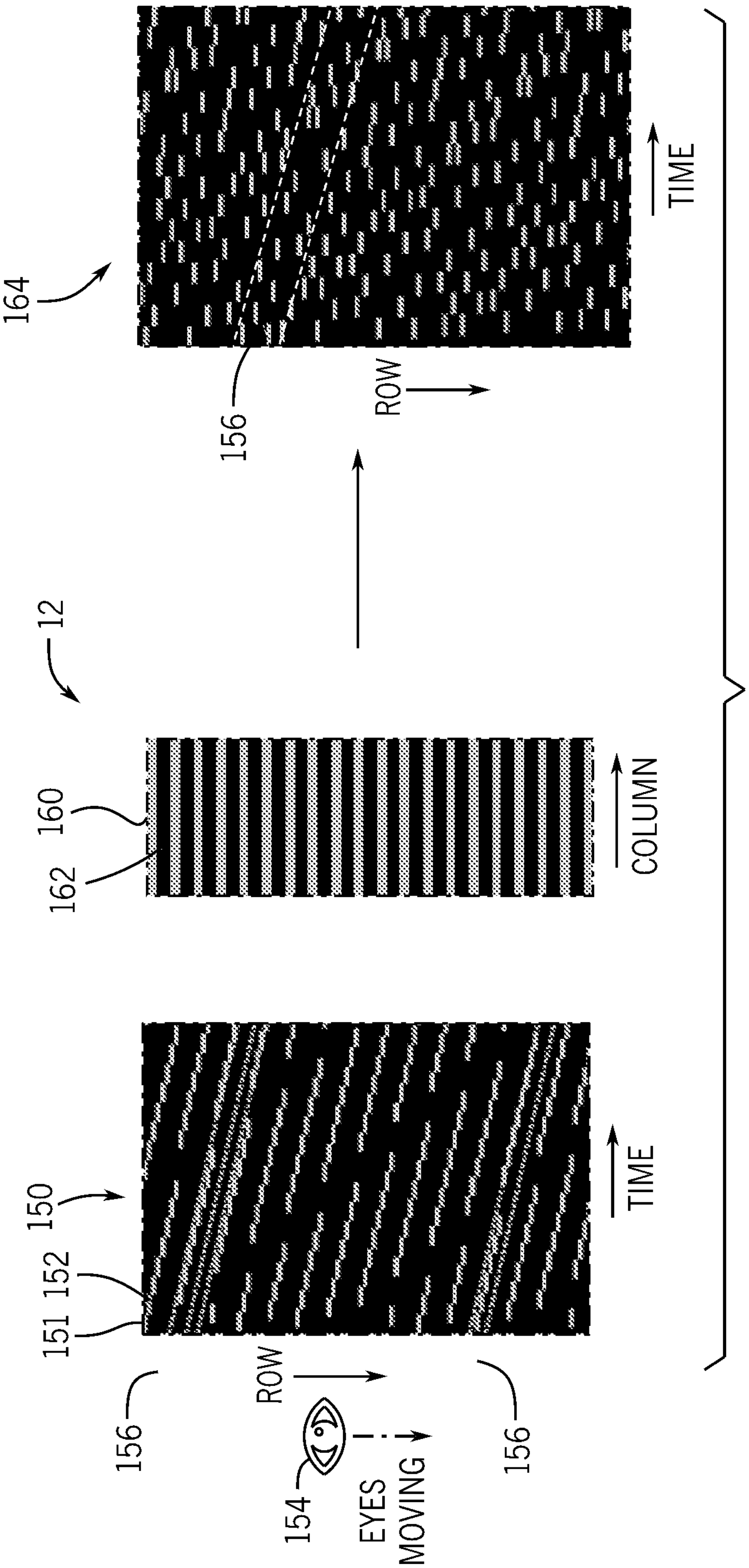
FIG. 11 is a schematic illustration of a timing diagram of the micro-LED display of FIG. 7 in which the micro-driver drives row emissions of the display pixels based on the digital code, in accordance with an embodiment of the present disclosure.

For example, the micro-driver 78 may drive rows of display pixels 77 emit light to produce image content for display by the electronic display 12. FIG. 11 illustrates a timing diagram 150 for when different rows of the electronic display 12 display one subframe of image content on the electronic display 12. The timing diagram 150 shows rows of the electronic display 12 (ordinate) illuminated over time (abscissa). At point 151, the first row is illuminated, along with several other rows further down the electronic display 12. For example, each micro-driver 78 may illuminate a particular row of the LPMs 92 that it controls. At point 152, the first row is no longer illuminated, but a second row is illuminated, along with several other rows further down the electronic display 12. For example, each micro-driver 78 may illuminate a different particular row of the LPMs 92 that it controls. This continues over time. If an eye 154 that is viewing the electronic display 12 is not moving, the eye 154 may integrate the light from the different rows and may see a complete image on the electronic display 12, even though only one row per LPM 92 is being illuminated at any given time. If an eye 154 that is viewing the electronic display moves (e.g., in a saccade) at the same or a similar rate at which the different rows are being illuminated down the electronic display 12, however, the eye 154 may integrated light from multiple different rows—some of which are illuminated at the time the eye 154 sees them and some of which are off at the time the eye 154 sees them. For example, if the eye has a movement 156, it may detect a repeating pattern over time. This may result in the appearance of bright lines 160 and dark lines 162, even if the display 12 is actually being illuminated evenly over time.

Figure 12:
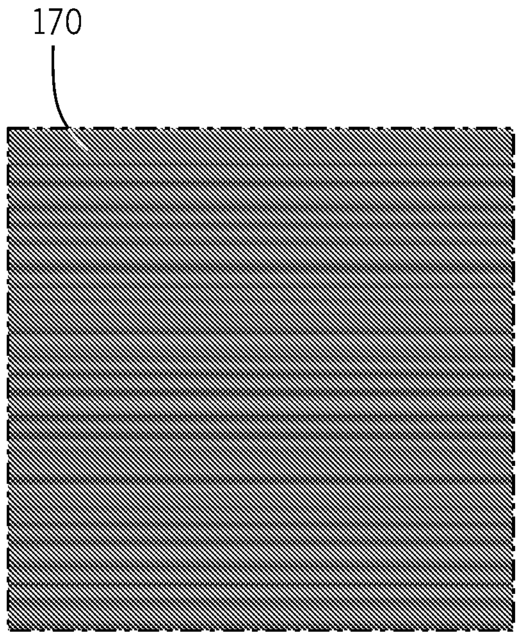
FIG. 12 is a schematic illustration depicting an image artifact that is less visible on the micro-LED display of FIG. 7 after row emission shuffling, in accordance with an embodiment of the present disclosure.

Such image artifacts may be reduced or eliminated by shuffling the timing of the row emissions, as depicted by a timing diagram 164 of FIG. 11. With row shuffling, when the eye has movement 156, the resulting pattern will be less problematic, which is shown in FIG. 12. Here, the eye 154 may integrate row emissions to see image content 170, which may have a reduced image artifact effect as compared to the image content shown in FIG. 11. Thus, shuffling row illumination order may compensate for saccades, and the visibility of the image artifact may be reduced or eliminated. Various different patterns for row emission shuffling will be described in greater detail below.

Figure 13:
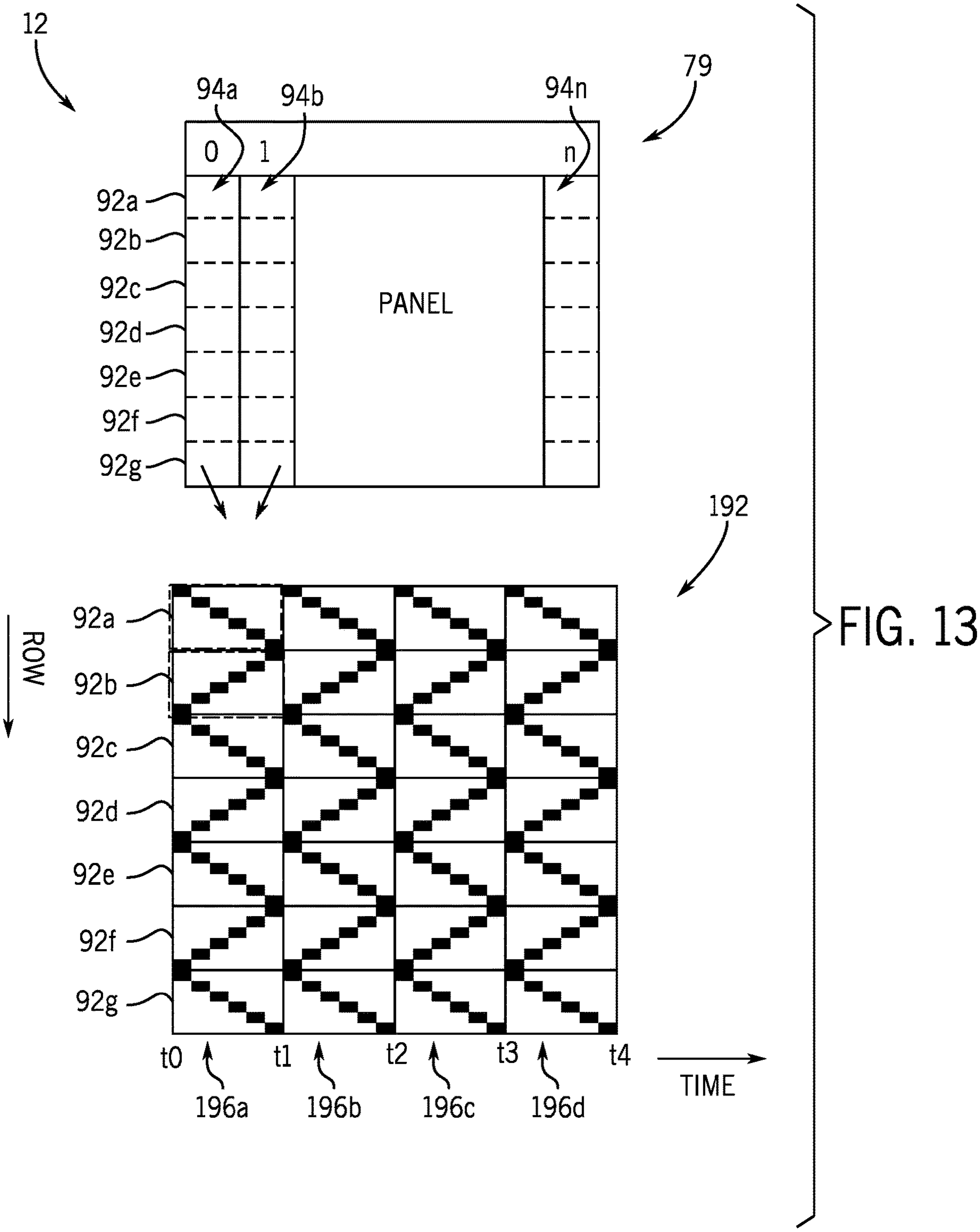
FIG. 13 is a schematic illustration of a timing diagram of the micro-LED display of FIG. 7, where the micro-driver drive row emissions of the display pixels by implementing a shuffled row illumination pattern, in accordance with an embodiment of the present disclosure.

FIG. 13 illustrates a row shuffling pattern in which alternating local passive matrices (LPMs) 92 have different row illumination patterns. Indeed, in the example of FIG. 13, different columns 94 may all share a row shuffling pattern 192. The array 79 shown in FIG. 13 includes a first column 94*a*, a second column 94*b*, . . . , an n-th column 94*n*, which may correspond to a first column, a second column, . . . , an n-th column In the illustrated example, n may be any suitable integer. That is, the electronic display 12 may include any suitable number of columns 94.

Each LPM column 94 may include any suitable number of LPMs 92. In the example of FIG. 13, one column 94 may include these include a first LPM 92*a*, a second LPM 92*b*, a third LPM 92*c*, a fourth LPM 92*d*, a fifth LPM 92*e*, a sixth LPM 92*f*, and a seventh LPM 92*g*, but there may be more or fewer LPM s 92 per column 94. The row shuffling pattern 192 shows the illumination of rows (ordinate) over time (abscissa), including multiple subframe periods 196. Here, a first subframe period 196*a* takes place from time t0 to t1, a second subframe period 196*b* takes place from time t1 to t2, a third subframe period 196*c* takes place from time t2 to t3, and a fourth subframe period 196*d* takes place from time t3 to t4. There may be more or fewer subframe periods 196 for each frame of image data (e.g., new frame of image content) and the pattern may repeat as shown or may vary.

In the example of FIG. 13, all LPM columns 94 may use the same row shuffling pattern 192, which varies by LPM row 96. To reduce or eliminate image artifacts due to sequential row illumination timing, the row shuffling pattern 192 may be the same for alternating LPM rows 96. By way of example, the odd numbered LPMs 92 may be driven with a first pattern and the even numbered LPMs 92 may be driven with a second pattern. As illustrated, the first LPM 92*a*, the third 92*c*, the fifth LPM 92*e*, and the seventh LPM 92*g*, the rows may be illuminated sequentially from a top row of the respective LPM 92 to a bottom row of the respective LPM 92. For the second LPM 92*b*, the fourth LPM 92*d*, and the sixth 92*f*, the rows may be illuminated sequentially from a bottom row of the respective LPM 92 to a top row of the respective LPM 92. The same pattern may repeat for each subframe period 196.

Figure 14:
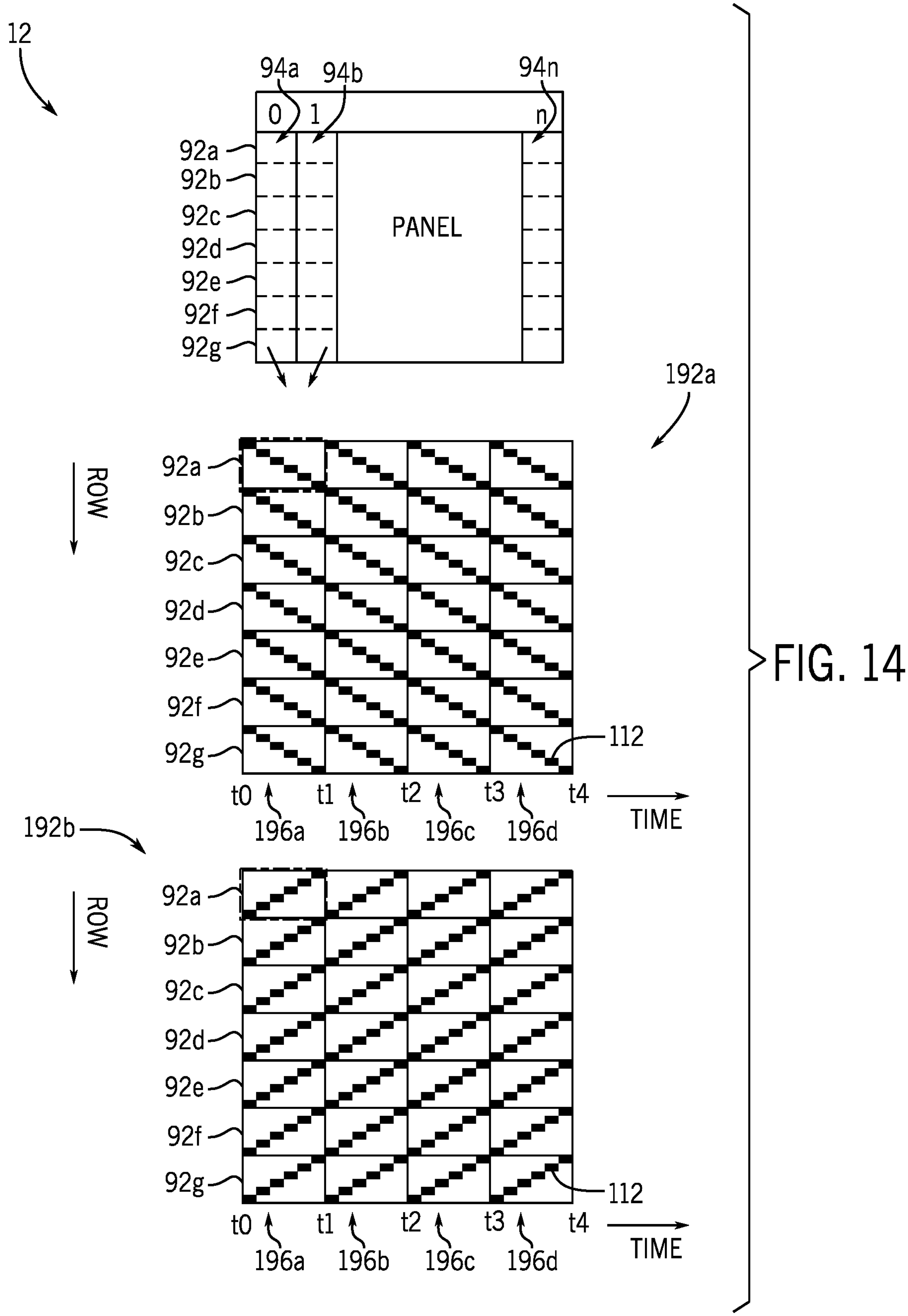
FIG. 14 is a schematic illustration of a timing diagram of the micro-LED display of FIG. 7, where the micro-driver drive row emissions of the display pixels by implementing different row illumination pattern per column, in accordance with an embodiment of the present disclosure.

FIG. 14 illustrates a row shuffling pattern in which alternating columns 94 have different row shuffling patterns 192*a* and 192*b*. The array 79 shown in FIG. 14 includes a first column 94*a*, a second column 94*b*, . . . , an n-th colum 94*n* representing a first column, a second column, . . . an n-th column, where n is any suitable integer. Each column 94 may include any suitable number of LPMs 92. In the example of FIG. 14, these include the first LPM 92*a*, the second LPM 92*b*, the third LPM 92*c*, the fourth LPM 92*d*, the fifth LPM 92*e*, the sixth LPM 92*f*, and the seventh LPM 92*g*, but there may be more or fewer LPMs 92 per column 94. The row shuffling patterns 192*a* and 192*b* show the illumination of rows (ordinate) over time (abscissa), including multiple subframe periods 196. A first subframe period 196*a* takes place from time t0 to t1, a second subframe period 196*b* takes place from time t1 to t2, a third subframe period 196*c* takes place from time t2 to t3, and a fourth subframe period 196*d* takes place from time t3 to t4. There may be more or fewer subframe periods 196 for each frame of image data (e.g., new frame of image content) and the pattern may repeat as shown or may vary.

In the example of FIG. 14, different columns 94 may use different row shuffling patterns 192, though the pattern used by each LPM 92 of the respective column 94 may be constant. For example, the first column 94*a* may use the row shuffling pattern 192*a* and the second LPM column 94*b* may use the row shuffling pattern 192*b*. In the row shuffling pattern 192*a*, each LPM 92 may illuminate rows sequentially from the top row of the respective LPM 92 to the bottom row of the respective LPM 92. In the row shuffling pattern 192*b*, each LPM 92 may illuminate rows sequentially from the bottom row of the respective LPM 92 to the top row of the respective LPM 92. Because different columns 94 have different row shuffling patterns, an eye moving its gaze across the display over time will be less likely to integrate light from multiple rows to create an apparent image artifact. Subsequent columns 94 may alternate row shuffling patterns.

While the example of FIG. 13 shows columns 94 that share the same row shuffling pattern that varies by LPM 92, and FIG. 14 shows columns 94 that have different row shuffling patterns that are the same for all LPMs 92 of each column 94, it should be appreciated that these patterns are provided by way of example and that there may be numerous suitable variations. Indeed, in other examples, different columns 94 may have different row shuffling patterns (e.g., as in FIG. 14) and different LPMs 92 in each column 94 may vary (e.g., as in FIG. 13). For example, a first column 94*a* may have the row shuffling pattern shown in FIG. 13 (e.g., row illumination top-to-bottom in odd numbered LPMs 92 and bottom-to-top in even-numbered LPMs 92) and a second column 94*b* may have an offset pattern from the row shuffling pattern shown in FIG. 13 (e.g., row illumination bottom-to-top in odd numbered LPMs 92 and top-to-bottom in even-numbered LPMs 92). Again, these examples are provided by way of example and are not intended to be exhaustive.

Figure 15:
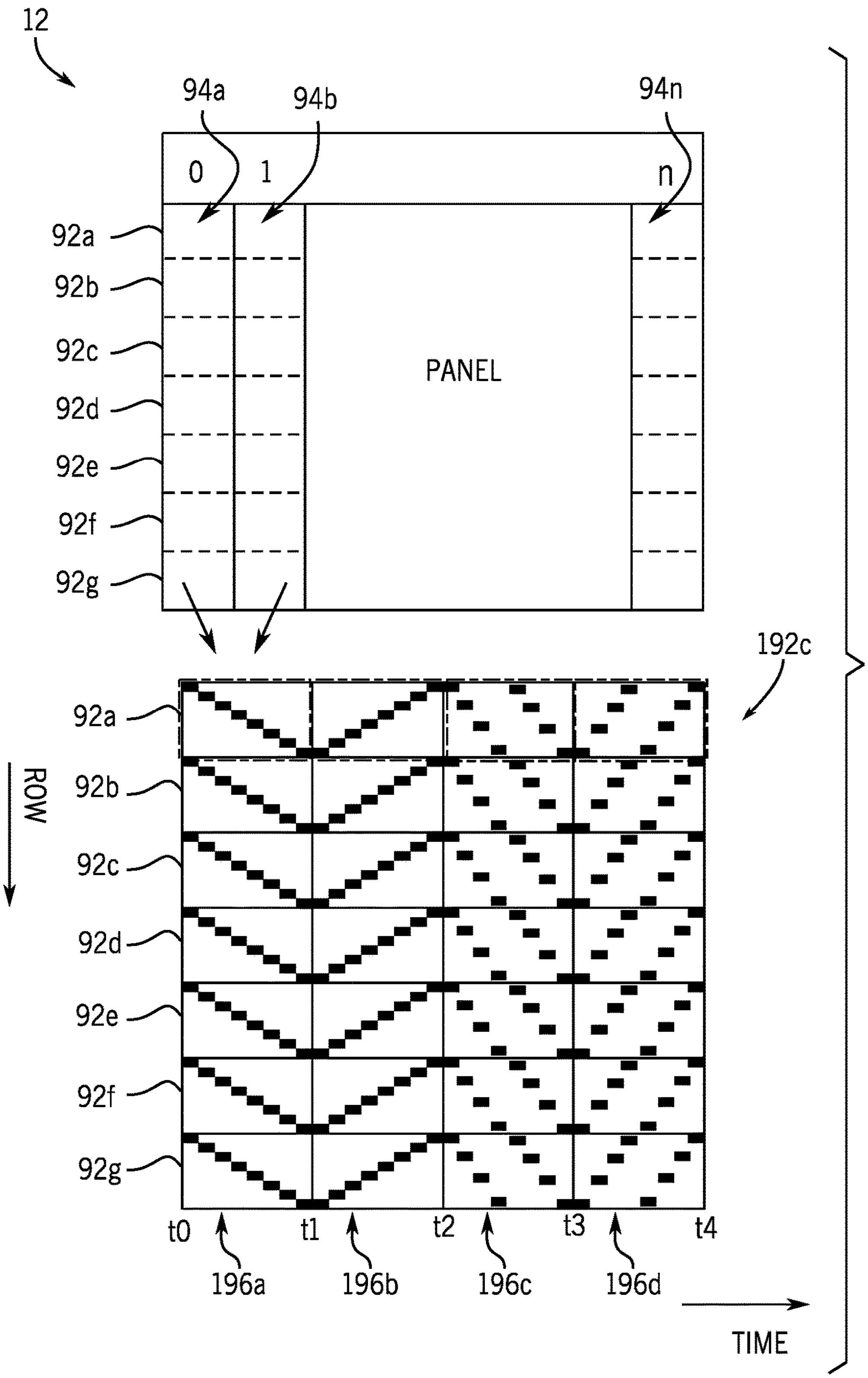
FIG. 15 is a schematic illustration of a timing diagram of the micro-LED display of FIG. 7, where the micro-driver drive row emissions of the display pixels by implementing multiple shuffled row illumination patterns over time, in accordance with an embodiment of the present disclosure.

Row shuffling patterns may also vary over time (e.g., by subframe period). FIG. 15 illustrates a row shuffling pattern 192*c* for a particular LPM column 94 that varies by subframe period 196. The row shuffling patterns 192*c* shows the illumination of rows (ordinate) over time (abscissa), including multiple subframe periods 196. A first subframe period 196*a* takes place from time t0 to t1, a second subframe period 196*b* takes place from time t1 to t2, a third subframe period 196*c* takes place from time t2 to t3, and a fourth subframe period 196*d* takes place from time t3 to t4. There may be more or fewer subframe periods 196 for each frame of image data (e.g., new frame of image content) and the pattern may repeat as shown or may vary.

In the example of FIG. 15, the row shuffling pattern 192*c* varies the row illumination pattern in different subframe periods 196. While the pattern used by each LPM 92 is shown to be the same in each subframe period 196, different LPMs 92 may use different patterns (e.g., as in FIG. 13). Additionally or alternatively, different columns 94 may use different patterns (e.g., as in FIG. 14). For instance, one column 94 may use a set of patterns like that shown by the row shuffling pattern 192*c* of FIG. 15, while another column 94 may use a set of patterns that is offset by subframe period 196 (e.g., one column 94 may have a pattern that starts with top-to-bottom row shuffling during the first subframe period 196*a* and another column 94 may have a pattern that starts with bottom-to-top shuffling during the first subframe period 196*a*). By temporally shuffling the order of row illumination, an eye moving its gaze across the display over time will be less likely to integrate light from multiple rows to create an apparent image artifact. Subsequent subframe periods 196 may repeat the pattern shown here or may use different patterns.

Figure 16:
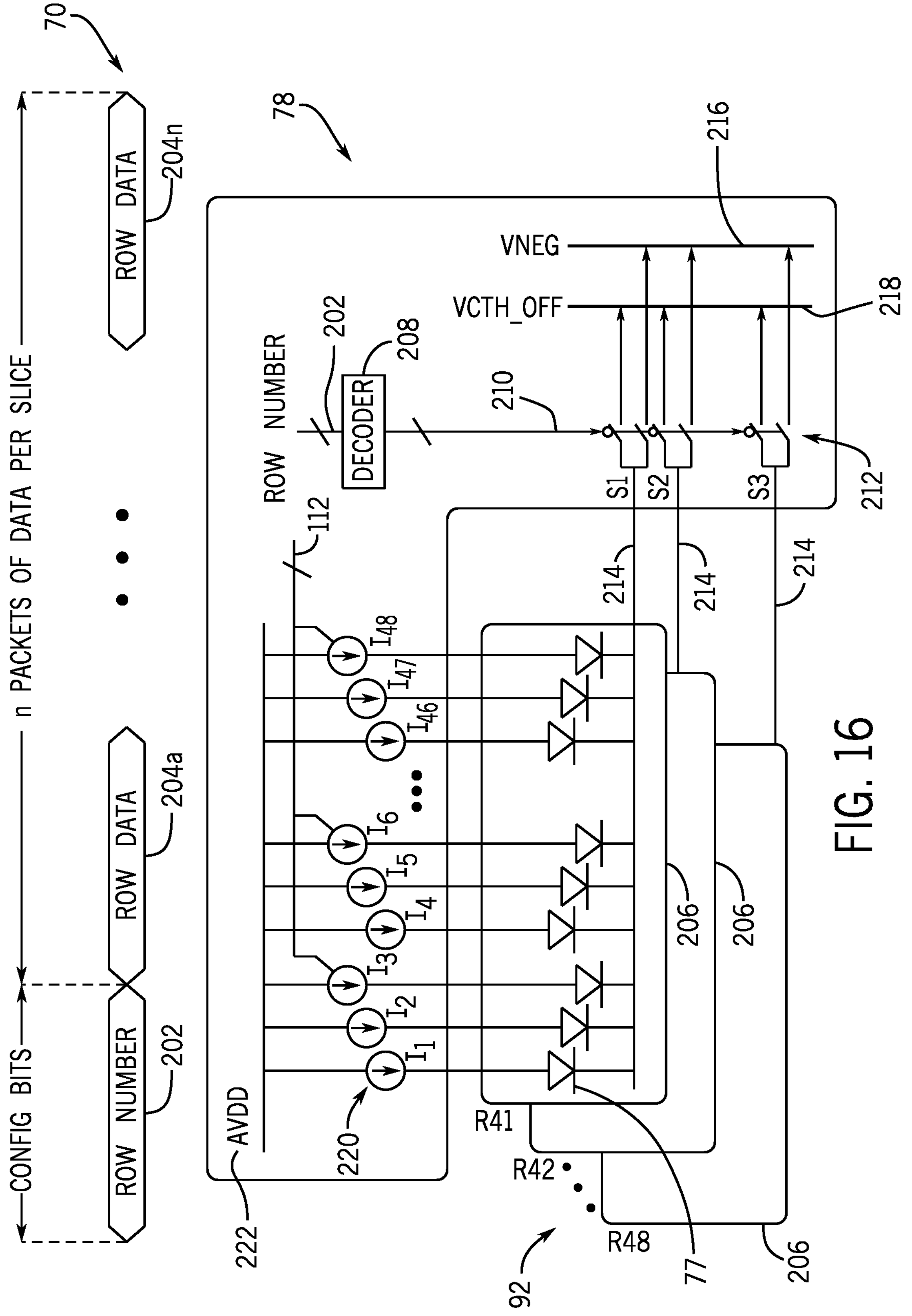
FIG. 16 is a circuit view of a micro-driver that may programmably shuffle rows that are illuminated for its local passive matrix display (LPM), in accordance with an embodiment of the present disclosure.

The micro-drivers 78 may be fixed or programmable. For example, each micro-driver 78 may carry out a fixed row illumination order, even if it is different from that of an adjacent micro-driver 78 (e.g., different from an adjacent micro-driver 78 in the same column 94 as in FIG. 13, or different from an adjacent micro-driver 78 in an adjacent column 94 as in FIG. 14). Additionally or alternatively, the micro-drivers 78 may be programmable by having circuitry to enable arbitrary illumination of rows, as shown in FIG. 16. This may allow the row shuffling pattern of the electronic display 12 to be controlled externally using extra configuration data 202 that are sent to the micro-driver 78.

The micro-driver 78 shown in FIG. 16 may receive image data 70 to control the display pixels 77 that include configuration bits 202 that include an indication of row number, along with row data 204 with image data for each display pixel 77 of a particular row 206. The row data 204 may include n packets of row data 204, where n is the number of display pixels rows 206 in the LPM 92. The row data 204 includes row data 204*a* for a first row of pixels 77 in the selected row 206*s*, and so forth, terminating with row data 204*n* for a final row of pixels 77 in the selected row 206*n* of the LPM 92. The configuration bits 202 may be decoded by a decoder 208 to generate a control signal 210 that controls a set of switches 212. The switches 212 may select the particular row 206 indicated by the row number encoded in the configuration bits 202. Based on the control signal 210, the switches 212 may couple a cathode 214 of the display pixels 77 of the selected row 206 to a low voltage (VNEG) 216 and may couple the cathodes 214 of the unselected rows 206 to a high voltage (VCTH_OFF) 218. All rows 206 of the LPM 92 may be coupled to a common set of current drivers 220, which may be supplied by any suitable supply voltage (AVDD) 222. Thus, the low voltage (VNEG) 216 may be any suitable voltage low enough to cause a voltage difference across the μLEDs of the display pixels 77 of a selected row 206 to exceed a diode threshold voltage. The high voltage (VCTH_OFF) 218 may be any suitable voltage high enough to cause the voltage difference across the μLEDs of the display pixels 77 of an unselected row 206 not to exceed the diode threshold voltage. When the emission signals 112 are sent to the current drivers 220 to pulse current to the display pixels 77, only the display pixels 77 of the row 206 that is coupled to the low voltage (VNEG) 216 (e.g., the row 206 selected based on the row number indicated by the configuration bits 202) may receive the pulses and, thus, emit light.

In this way, the image data 70 that are sent to the electronic display 12 may control the row illumination order. Based on the configuration bits 202, any suitable row order may be selected for each micro-driver 78. This may even enable different row illumination orders in each respective LPM 92. Accordingly, the row emission timing of the display pixels 77 generating image content for display on the electronic display 12 may be shuffled, thereby reducing or eliminating the image artifacts discussed herein.

Figure 17:
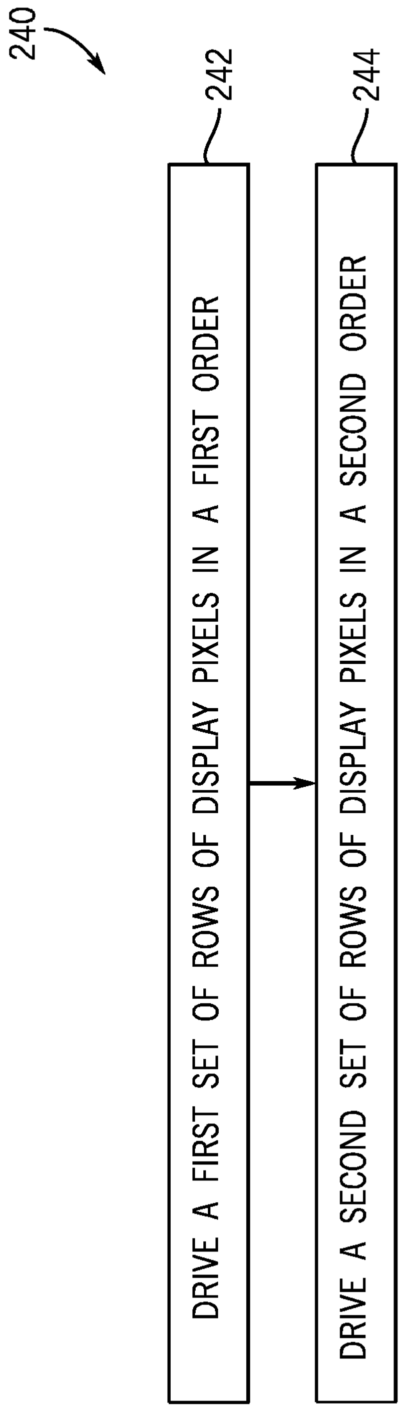
FIG. 17 is a flowchart of a method for spatially shuffling a row order of driving rows of display pixels, in accordance with an embodiment of the present disclosure.
Figure 18:
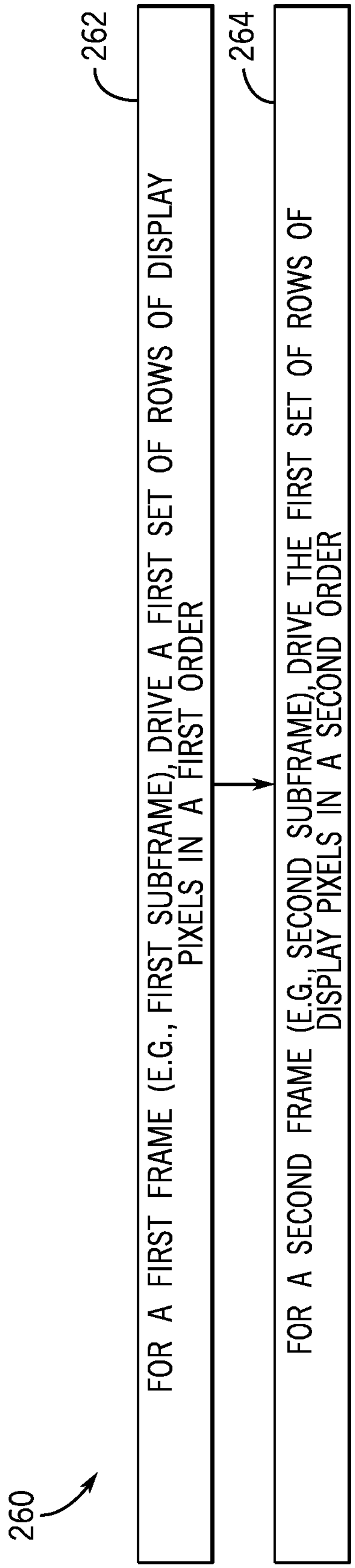
FIG. 18 is a flowchart of a method for temporally shuffling a row order of driving rows of display pixels, in accordance with an embodiment of the present disclosure.

Whether using the programmable micro-driver 78 described with reference to FIG. 16 or another micro-driver 78 that is designed to drive display pixels in a particular order, shuffling the row order spatially or temporally, or both spatially and temporally, may reduce or eliminate an image artifact that could arise when the row order is spatially and/or temporally uniform. FIG. 17 illustrates a flowchart 240 of a method for spatially shuffling a row order of driving the rows of display pixels. A first set of rows of display pixels may be driven in a first order (block 242) and a second set of rows of display pixels may be driven in a second order (block 244) (e.g., as shown in FIG. 13 or 14). FIG. 18 illustrates a flowchart 260 of a method for temporally shuffling a row order of driving the rows of display pixels. For a first frame or subframe (e.g., for an entire first image frame or for a first subframe of the first image frame), a first set of rows of display pixels may be driven in a first order (block 262). For a second frame or subframe (e.g., for an entire second image frame or for a second subframe of the first image frame), the first set of rows of display pixels may be driven in a second order (block 264) (e.g., as shown in FIG. 15). The methods shown in the flowcharts of FIGS. 17 and 18 are not mutually exclusive and may be used together to perform both spatial and temporal row shuffling to further reduce a likelihood of an image artifact.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Moreover, the specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

What is claimed is:

1. An electronic display comprising:

a plurality of rows of light emitting diode display pixels comprising a first set of rows of display pixels and a second set of rows of display pixels; and driving circuitry configured to spatially shuffle or temporally shuffle, or both spatially shuffle and temporally shuffle, a row order of driving the plurality of rows of display pixels by:

driving the first set of rows of display pixels based on a first monotonically from a top row to a bottom row of the first set of rows of display pixels increasing order; and driving the second set of rows of display pixels based on a second monotonically from a bottom row to a top row of the second set of rows of display pixels decreasing order.

2. The electronic display of claim 1, wherein the driving circuitry comprises:

a first micro-light emitting diode (LED) driver configured to drive the first set of the rows of pixels in the first monotonically increasing order; and a second micro-LED driver configured to drive the second set of the rows of pixels in the second monotonically decreasing order.

3. The electronic display of claim 1, wherein the driving circuitry is configured to temporally shuffle the row order of driving the plurality of rows by driving a first set of the rows of pixels in the first monotonically increasing order during a first subframe and driving the first set of the rows of pixels in the second monotonically decreasing order during a second subframe.

4. The electronic display of claim 1, wherein the plurality of rows of display pixels are divided into columns of local passive matrices configured to be individually controlled by the driving circuitry to emit light row-by-row.

5. The electronic display of claim 4, wherein the driving circuitry is configured to spatially shuffle the row order of driving the plurality of rows by driving a first set of the rows of pixels of a first column in the first monotonically increasing order and driving the first set of the rows of pixels of a second column in the second monotonically decreasing order.

6. The electronic display of claim 5, wherein the driving circuitry comprises:

a first micro-light emitting diode (LED) driver configured to drive the first set of the rows of pixels of the first column in the first monotonically increasing order; and a second micro-LED driver configured to drive the first set of the rows of pixels of the second column in the second order, wherein the first order is different from the second monotonically decreasing order.

7. The electronic display of claim 4, wherein the driving circuitry is configured to spatially shuffle the row order of driving the plurality of rows by driving all of the rows of pixels of a first column in the first monotonically increasing order and driving all of the rows of pixels of a second column in the second monotonically decreasing order.

8. The electronic display of claim 4, wherein the driving circuitry is configured to spatially shuffle the row order of driving the plurality of rows by driving all of a first set of the rows of pixels of all columns in the first monotonically increasing order and driving all of a second set of the rows of pixels of all columns in the second monotonically decreasing order.

9. The electronic display of claim 1, wherein the driving circuitry comprises a plurality of micro-light emitting diode (LED) drivers configured to programmably select rows to spatially shuffle or temporally shuffle, or both spatially and temporally shuffle, a row order of driving the plurality of rows of display pixels based on the first monotonically increasing order and the second monotonically decreasing order.

10. The electronic display of claim 1, wherein the driving circuitry is configured to:

at a first time, drive the first set of rows of the display pixels based on the first monotonically increasing order and drive the second set of rows of display pixels based on the second monotonically decreasing order; and at a second time, drive the first set of rows of the display pixels based on a third order.

11. The electronic display of claim 10, wherein the third order comprises a row order that alternates rows, wherein two adjacent rows are not driven in sequence.

12. One or more tangible, non-transitory, machine-readable media comprising instructions that, when executed by one or more processors, cause the one or more processors to cause operations comprising:

spatially shuffling an order of driving a plurality of rows of light emitting diode display pixels of an electronic display by:

causing at least some display pixels of a first set of the rows of display pixels to be driven in a first monotonically from a top row to a bottom row of the first set of rows of display pixels increasing order; and causing at least some display pixels of a second set of the rows of display pixels to be driven in a second monotonically from a bottom row to a top row of the second set of rows of display pixels decreasing order; or temporally shuffling an order of driving a plurality of rows of light emitting diode display pixels of an electronic display by:

causing at least some display pixels of a first set of the rows of display pixels to be driven in a first monotonically increasing order from a top row to a bottom row of the first set of rows of display pixels during a first frame or subframe; and causing the at least some display pixels of the first set of the rows of display pixels to be driven in a second monotonically decreasing order from the bottom row to the top row of the first set of rows of display pixels during a second frame or subframe.

13. The one or more tangible, non-transitory, machine-readable media of claim 12, wherein the causing the at least some display pixels of the first set of the rows of display pixels to be driven in the first monotonically increasing order comprises generating first image data for a first micro-light emitting diode (LED) driver of the electronic display according to the first monotonically increasing order, and wherein the causing the at least some display pixels of the second set of the rows of display pixels to be driven in the second monotonically decreasing order comprises generating second image data for a second micro-LED driver of the electronic display according to the second monotonically decreasing order.

14. The one or more tangible, non-transitory, machine-readable media of claim 12, wherein the causing the at least some display pixels of the first set of the rows of display pixels to be driven in the first monotonically increasing order during the first frame or subframe comprises generating image data for a first micro-light emitting diode (LED) driver of the electronic display according to the first monotonically increasing order for the first frame or subframe, and wherein the causing the at least some display pixels of the first set of the rows of display pixels to be driven in the second monotonically decreasing order during the second frame or subframe comprises generating second image data for the first micro-LED driver of the electronic display according to the second monotonically decreasing order for the second frame or subframe.

15. An electronic display comprising:

a plurality of local passive matrices arranged in rows and columns, wherein each local passive matrix comprises a plurality of rows of light emitting diode display pixels;

a plurality of micro-light emitting diode (LED) drivers configured to drive respective local passive matrices of the plurality of local passive matrices one row at a time based on a first monotonically from a top row to a bottom row of the plurality of rows of display pixels of the local passive matrix increasing order and a second monotonically from the bottom row to the top row of the plurality of rows of display pixels of the local passive matrix decreasing order, wherein a micro-LED driver of the plurality of micro-light emitting diode (LED) drivers comprises row selection circuitry to programmably select which row to drive.

16. The electronic display of claim 15, wherein the micro-LED driver of the plurality of micro-LED drivers is configured to receive image data comprising an indication of the row to drive based on the first monotonically increasing order or the second monotonically decreasing order, and wherein the micro-LED driver causes the micro-LED driver to select that row using the row selection circuitry.

17. The electronic display of claim 16, wherein the row selection circuitry of the micro-LED driver comprises:

decoder circuitry configured to decode the indication of the row to drive to generate selection signals; and switches configured to be controlled by the selection signals.

18. The electronic display of claim 17, wherein the decoder circuitry is configured to generate the selection signal to cause the switches to connect a cathode of the row to drive to a first voltage and cathodes of other rows to a second voltage higher than the first voltage.

19. An electronic device comprising:

processing circuitry configured to produce configuration data for display on an electronic display, wherein the configuration data specifies a first monotonically increasing order from a top row to a bottom row of a first set of rows of light emitting diode display pixels to be illuminated and pixel data for the display pixels of the first set of rows and a second monotonically decreasing order from a bottom row to a top row of a second set of rows of light emitting diode display pixels to be illuminated and pixel data for the display pixels of the second set of rows, wherein the first order is different from the second order; and the electronic display comprising a plurality of micro-light emitting diode (LED) drivers configured to receive the pixel data, select the row specified by the configuration data, and drive the display pixels of the row using the pixel data of the configuration data.

20. The electronic device of claim 19, wherein the processing circuitry is configured to produce sets of image data specifying different rows in an order that varies from one frame to another frame or one subframe to another subframe.

21. The electronic device of claim 19, wherein the processing circuitry is configured to generate sets of configuration data for the plurality of micro-LED drivers, wherein the sets of configuration data specify different rows in orders that vary from a first micro-LED driver of the plurality of micro-LED drivers to a second micro-LED driver of the plurality of micro-LED drivers.

22. A method comprising:

driving rows of light emitting diode display pixels of a first local passive matrix of an electronic display in a first monotonically from a top row to a bottom row of the first local passive matrix increasing order during a first frame or subframe; and driving the rows of display pixels of the first local passive matrix in a second monotonically from the bottom row to the top row of the first local passive matrix decreasing order during a second frame or subframe or driving rows of a second local passive matrix of the electronic display in the second monotonically decreasing order from a bottom row to a top row of the second local passive matrix during the first frame or subframe, wherein the second order is different from the first order.

23. The method of claim 22, comprising driving the rows of the display pixels of the first local passive matrix in a third order during a third frame or subframe, wherein the third order is different from the first monotonically increasing order and the second monotonically decreasing order.

24. The method of claim 23, wherein the third order comprises a row order that alternates rows, wherein two adjacent rows are not driven in sequence.

* * * * *